Figure 1:
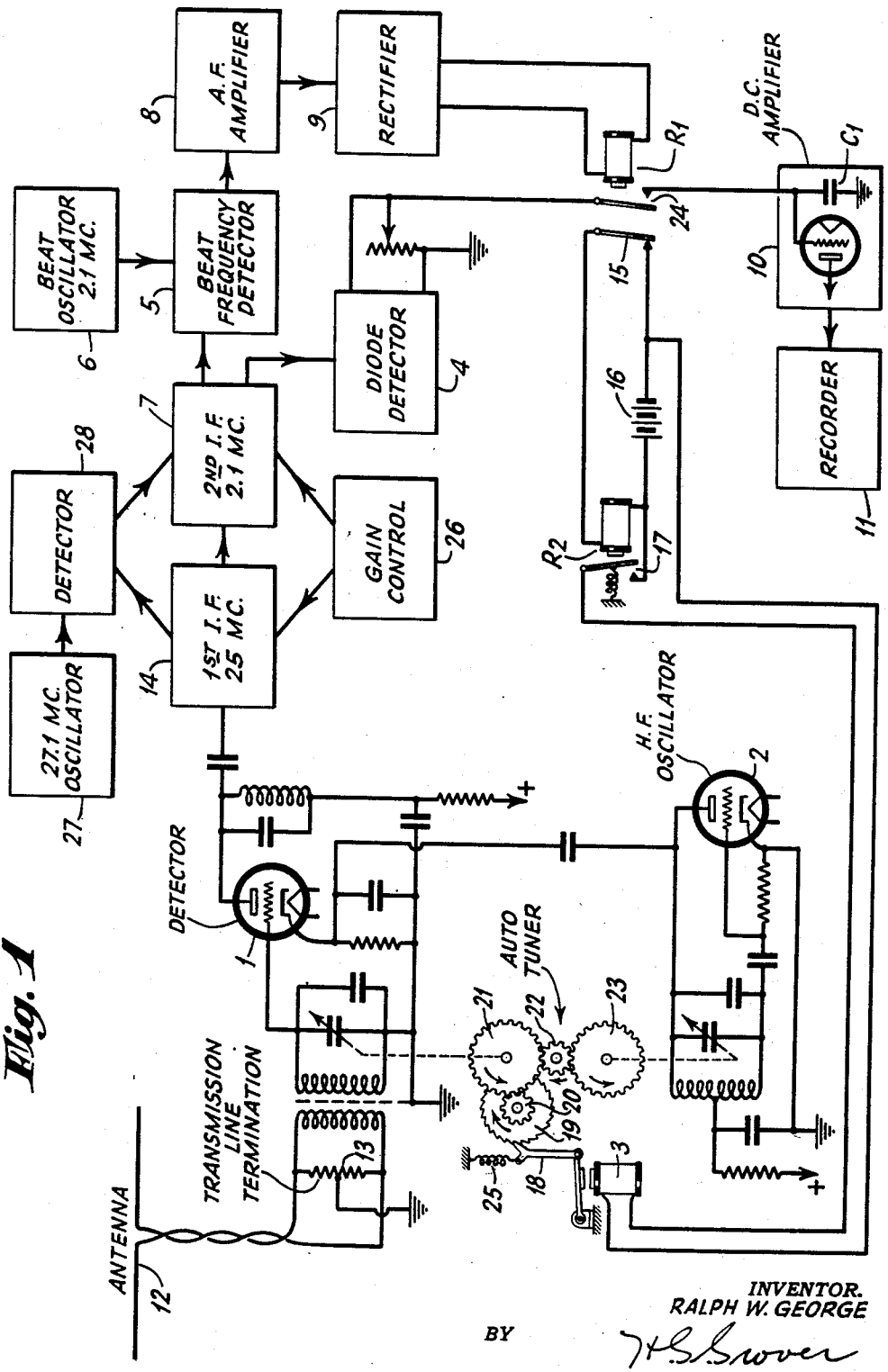

Feb. 20, 1940. R. W. GEORGE 2,191,277
METHOD OF AND APPARATUS FOR MAKING MEASUREMENTS AT ULTRA HIGH FREQUENCIES
Filed Sept. 16, 1938 2 Sheets-Sheet 1

INVENTOR.
RALPH W. GEORGE
BY
ATTORNEY.

Feb. 20, 1940.   R. W. GEORGE   2,191,277
METHOD OF AND APPARATUS FOR MAKING MEASUREMENTS AT ULTRA HIGH FREQUENCIES
Filed Sept. 16, 1938   2 Sheets-Sheet 2
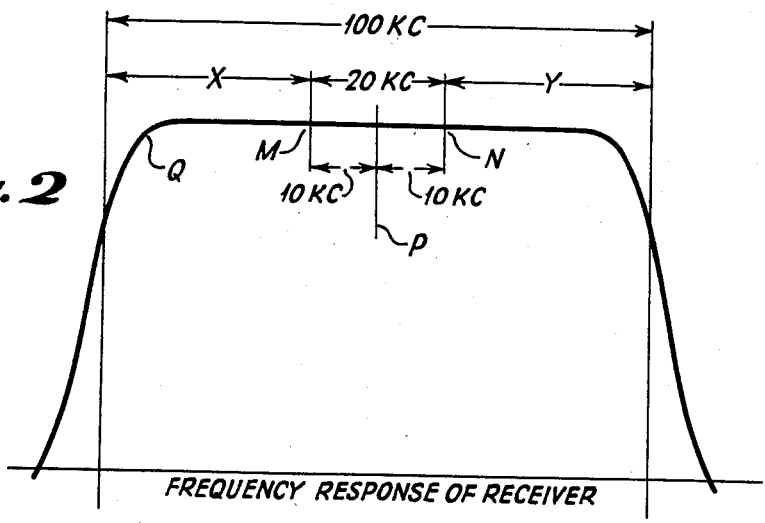
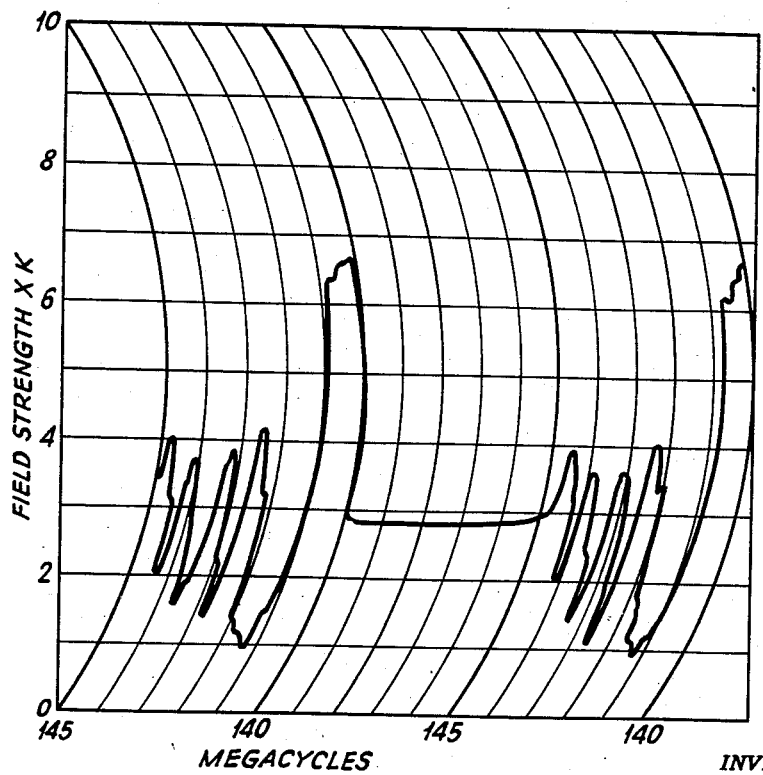
INVENTOR.
RALPH W. GEORGE
BY
ATTORNEY.

Patented Feb. 20, 1940

2,191,277

UNITED STATES PATENT OFFICE 2,191,277

METHOD OF AND APPARATUS FOR MAKING MEASUREMENTS AT ULTRA HIGH FREQUENCIES

Ralph W. George, Riverhead, N. Y., assignor to Radio Corporation of America, a corporation of Delaware Application September 16, 1938, Serial No. 230,245

13 Claims. (Cl. 250—1)

The present invention relates generally to radio frequency measuring instruments capable of receiving a band of frequencies.

One of the objects of the invention is to provide a measuring instrument which will show the amplitude variation in a received signal over a wide frequency range.

Another object is to provide such a measuring instrument which will automatically record the amplitude variation with frequency in a form which is easily interpreted without the need for corrections or excessive computations.

A further object is to make field strength versus frequency measurements by means of a wide band receiver associated with a suitable recorder, whereby any one measurement is made at the middle of the pass band of the receiver, this measurement being caused by an audio frequency output obtained from a beat frequency oscillator combined with the signal in a separate detector to give a beat frequency equal to the middle of the pass band.

A feature of the invention resides in the use of an automatic step-by-step frequency control coordinated with the measuring system for enabling the recording of a large number of measurements over the frequency range of the receiver in a quick and efficient manner.

The present invention provides, inter alia, field strength measuring apparatus for studying the characteristics of propagation paths between a radio transmitter and a remotely located receiver. Such a study is especially desirable where the difference between direct and indirect path lengths of the radio waves is relatively small, and ultra short waves are involved, such as in television. The apparatus of the present invention, hereinafter described, has been used successfully in connection with such a study to measure and record received field strength as the transmitter frequency is varied at a constant rate of change over a 5 megacycle range. Measurements over this 5 megacycle range have been found sufficient to indicate the existence and some important characteristics of indirect paths which have time delays long enough to cause distortion in television reception. The transmitter frequency is preferably controlled automatically by such means as a synchronous motor. The recording measuring system herein described assumes the burden of following the transmitter frequency and making measurements accordingly.

In brief, the measuring apparatus of the invention utilizes a wide band receiver associated with a suitable recorder, with automatic step-by-step tuning mechanism for enabling a greater number of measurements to be taken than is possible by manual operation. The receiver is of the conventional type, permitting measurements at low field intensities, and is designed to have a constant response over a 5 megacycle range.

By making the transmitting and receiving equipment conform to the following conditions, the recorded data, obtained in accordance with my method, requires no corrections in order to determine the field strength at a given frequency: (a) The transmitting system should be so designed that the radiated power is constant as the frequency varies over a range of 5 megacycles; let us say, from 81 to 86 megacycles or from 140 to 145 megacycles. (b) The transmitted frequency should vary at some suitable rate, such as a 166 kilocycle change per second, so as to require a short period of time, for example, one-half minute to go from one extreme of the frequency range to the other. (c) Constant voltage should be delivered to the receiver for constant field strength at the receiving antenna. This may be accomplished by the use of a half-wave doublet receiving antenna having substantially constant response over the desired 5 megacycle range, connected to a 75 or 100 ohm transmission line terminated with resistance at the receiver.

One advantage of the preferred method of measurement to be hereinafter described, utilizing automatic tuning at the receiver, is that it is very convenient because no manual tuning of the receiver to the changing transmitter frequency is necessary, except in rare cases when at some frequency the signal intensity becomes too low to give an audio beat note of sufficient strength to cause a measurement to be made.

A better understanding of the invention may be had by referring to the following description, which is accompanied by drawings, wherein:

Fig. 1 illustrates a preferred type of receiver for making field strength measurements versus frequency, in accordance with the principles underlying the invention;

Fig. 2 graphically illustrates the frequency response of the receiver of Fig. 1; and Fig. 3 illustrates frequency versus amplitude curves recorded by the apparatus of Fig. 1.

Fig. 1 illustrates an ultra high frequency triple-detection receiver having a 100 kilocycle intermediate frequency pass band, this receiver comprising a first detector 1 for detecting the signal received over a half wave doublet antenna 12 and beating with the output of the local oscillator 2; a first intermediate frequency amplifier 14; a second beating oscillator 27; a second detector 28; a second intermediate amplifier 7, a third beating oscillator 6; a third detector 5; an audio frequency amplifier 8; a direct current amplifier 10; and a suitable recorder 11. An automatic step-by-step frequency control 3 coordinated with the measuring system, is used for simultaneously changing the tuning of the detector circuit 1 and the tuning of the oscillator 2 by working on their respective variable condensers, as shown. Element 13 is a transmission line termination. There are also employed in the receiver a detector 4 and relays R₁ and R₂ whose functions are described later. The controls of the ultra high frequency detector 1 and the heterodyne oscillator 2 are ganged together, and the circuits of the receiver adjusted to band spread a 5 megacycle signal range over the major portion of the control dial. The response of the over-all receiver is adjusted to be constant over this required tuning range. It is not considered feasible to incorporate a conventional automatic frequency control of the ultra high frequency circuits because of the required flexibility of the measuring system.

Gain control device 26 serves to provide a simple manual control of the bias of two or three intermediate frequency amplifier tubes.

In the operation of the system, a measurement is made when the incoming signal, changing in frequency, is at the mid band of the intermediate frequency amplifier. Thus, the incoming signal is in the receiver about three-tenths of a second before it reaches the middle of the pass band, a condition which gives the diode detector 4 time to reach an output corresponding to the input signal. This time is determined by the band width of the receiver and the rate of change of frequency. In other words, the signal requires about three-tenths of a second to travel the distance X, Fig. 2, at the rate of 166 kilocycles per second. The audio tone is utilized to cause a measurement to be made in the recorder 11 and this audio tone is obtained by combining in a separate detector 5 the intermediate signal frequency and the frequency of a beat oscillator 6 tuned to the mid band frequency of the second intermediate frequency amplifier 7. This tone, fed through an audio amplifier 8 and associated rectifier 9, causes the relay R₁ to connect the diode 4 to the grid of the first direct current amplifier tube 10 for the duration of the tone which is about 0.12 second. This time of actual sampling of the diode voltage is determined by the audio frequency range of response and the rate of change of frequency, neglecting the lag in relay operation time which is small. It will be seen that the audio tone output begins at about 10 kilocycles when the diode is connected, the frequency decreases, goes through zero and again increases to about 10 kilocycles at which time the diode is disconnected. Obviously, the output of the audio amplifier is zero at and very near zero frequency; however, this time interval of zero output was so small that R₁ did not release. The small condenser C₁ is charged to the value of the voltage from diode 4 and maintains this voltage on the grid of the first direct current amplifier tube 10 after the signal has passed out of the audio frequency pass band and the diode has been disconnected at R₁. To accomplish this, it is important that the grid current of the first direct current amplifier be extremely low, a condition that is easily obtained by the use of a G. E. FP–54 type tube. The capacity of C₁ should be rather small, on the order of 0.01 microfarad, in order for it to be fully charged in the short charging time allowed. With this arrangement, over an hour is required for the grid voltage to decay to 37 percent of its original value from which it will be seen that no appreciable change will occur between measurements. The charge on condenser C₁ readily decreases to the value of the impressed voltage by virtue of the discharge path through the diode resistance which is available at the time the voltage is impressed on the condenser. The direct current amplifier preferably has a linear input-output characteristic and may operate a conventional recorder 11. This method of holding the recorder at its last measurement until a subsequent measurement is made, is advantageous in that a sequence of measurements gives an approximately smooth curve, and also gives the recorder movement time to indicate the true amplitude of each measurement. Recorder 11 may comprise an ink recorder in which the paper moves at a constant speed, thereby indicating constant and known signal frequency increments versus incremental distances of paper movement.

With the system as described up to this point, it will be apparent that if the receiver is tuned to say the low frequency end of the 5 megacycle signal frequency range, say 140 megacycles, a measurement will be made as the transmitter frequency, increasing from its minimum value, passes through the pass band of the receiver. After this measurement, if the receiver is quickly tuned to a higher frequency, ahead of the increasing signal frequency, the increasing signal frequency will again come into the audio frequency pass-band of the receiver and cause another measurement to be made. By carrying on this procedure, a complete series of measurements can be made. In advancing the receiver tuning, the receiver is tuned through the signal frequency but this is done so quickly that the signal is not in the pass-band long enough to cause a false measurement to be made. If tuning of the first detector and first heterodyne oscillator circuits is done by hand, in this manner there can be obtained about fifty measurements over the 5 megacycle range in one-half minute, spaced with fairly equal frequency increments according to the skill of the operator. The automatic receiver tuning means 3, however, permits about seventy measurements to be made with substantially equal frequency increments between measurements.

The automatic tuning feature functions as follows:

At the instant an incoming signal causes relay R₁ to operate, there is removed the holding current for relay R₂ which extends over a path including contacts 15 and battery 16, and the relay R₂ releases, in turn causing current from battery 16 to be supplied to the winding of auto tuner 3 over contacts 17 of relay R₂. The auto tuner 3 is arranged so that the application of current to its winding causes a pawl 18 to engage an advanced tooth on an associated ratchet 19 which is geared through gears 20, 21, 22 and 23 with the tuning controls. As the signal frequency increases, the audio beat note passes out of the response band of the audio frequency amplifier 8 and thus restores R₁ to normal. The return to normal of relay R₁ indicates that a measurement is completed. This last operation of R₁ first disconnects the diode 4 from the direct current amplifier 10 at contacts 24 of R₁, and then applies current to the relay R₂ via contacts 15. The application of current to relay R₂ causes contacts 17 to open, thus removing the energizing current from the auto tuner 3, the armature of which, in being restored to normal by a spring 24, causes the receiver tuning to be changed by means of the pawl 18 and ratchet 19. Auto tuner 3 is a step-by-step mechanism which by means of the gearing shown notches up the tuning controls to a higher frequency by approximately 70 kilocycle increments. The receiver tuning in this case may be adjusted to make a measurement at approximately each 70 kilocycles increment of the frequency range which gives a little over two measurements a second. More or less measurements per second may be made with corresponding smaller or greater frequency increments between measurements. The maximum number of measurements per second is obviously limited by the electrical and mechanical characteristics of the system.

Fig. 2 indicates graphically the frequency response of the receiver of Fig. 1 having a 100 kilocycle intermediate frequency pass band. The central portion of this pass band indicated by 20 kilocycles represents the extent of the audio response in the audio frequency amplifier 8. The interval X shown in Fig. 2 is the interval during which the diode voltage on the detector 4 builds up to a constant value, while the interval Y represents the safety range during which the condenser $C_1$ is disconnected from the diode detector 4 to insure that the diode voltage on detector 4 does not decrease before condenser $C_1$ is disconnected. The reference numeral Q represents the point at which the signal builds up proper voltage on the diode 4 corresponding to the signal which it is desired to measure. The reference numeral M represents the point on the pass band at which relay $R_1$ closes in order to connect the detector 4 to the condenser $C_1$, while the reference numeral N represents the point at which the relay $R_1$ releases to open the diode detector circuit 4 from condenser $C_1$. The position of reference numeral P indicates the mid band frequency to which the beat frequency oscillator is tuned; namely 2.1 megacycles.

Fig. 3 is a graph showing, under unchanged conditions, two curves of field strength versus frequency over the 5 megacycle range from 145 to 140 megacycles, obtained by apparatus constructed in accordance with the present invention.

As a matter of uniform procedure, the system is designed so that measurements are taken with increasing frequency. Thus, a few minutes of observation will indicate the proper gain of the receiver to use for the range of signal levels available and the measurements can be started by disengaging the automatic tuning drive and tuning the receiver to the lowest frequency. The automatic tuning drive may then be re-engaged and the series of measurements started when the signal begins increasing in frequency after reaching its lowest frequency.

With this system, it is only necessary to keep the transmitter frequency sweep in continuous operation and to observe a predetermined schedule for polarization of the transmission. That is, coordination between transmitter and receiver operators is required only when observing time schedules for the transmission of vertical, horizontal or circular polarized waves, otherwise coordination is not required in making measurements. Maximum stability of the measuring system is obtained by the use of voltage regulated power supplies. Normally the equipment is operated from 110 volt alternating current sources.

The apparatus for use at the transmitter may comprise any suitable equipment which will give the continuous sweep of frequencies in the desired ultra short wave range. As an illustration, this apparatus may comprise a transmitter whose oscillator is controlled by a resonant line, the tuning of which is continuously changed by a cam arrangement. A system of this type is described in copending application Serial No. 150,024, filed June 24, 1937, by Usselman.

Of course, if desired, the antenna of the receiver may be replaced by a known voltage in series with an equivalent antenna resistance, for the purpose of obtaining an absolute calibration of the measuring system. One means of calibrating and testing such a measuring system comprises a standard signal generator, such as is disclosed in my copending application Serial No. 216,874, filed July 1, 1938.

What is claimed is:

1. The method of measuring field strength at a receiver over a range of frequencies which includes the steps of radiating power which is constant over a desired range of frequencies, varying the radiated frequency at a constant rate over said desired range, receiving said continually varying frequency, rectifying the received carrier, and automatically recording said rectified carrier.

2. The method of measuring field strength at a receiver over a range of frequencies which includes the steps of radiating power which is constant over a desired range of signal frequencies, varying the signal frequency at a constant rate over said desired range, automatically changing the response frequency range of the receiver to correspond to the changing signal frequency, rectifying the received carrier, and automatically recording said rectified carrier.

3. The method of measuring field strength at a receiver over a range of frequencies which includes the steps of radiating power which is constant over a desired range of signal frequencies, varying the signal frequency at a constant rate over said desired range, automatically changing the response frequency range of the receiver to correspond to the changing signal frequency, combining the received signal frequency at the receiver with a locally generated frequency to produce an intermediate frequency, detecting said intermediate frequency, and automatically recording said detected frequency.

4. The method of measuring field strength at a receiver over a range of frequencies which includes the steps of radiating power which is constant over a desired range of signal frequencies, varying the signal frequency at a constant rate over said desired range, receiving first one signal frequency and automatically recording a measurement of the field strength of said signal frequency, and then retuning the receiver immediately after a measurement is recorded to change the response frequency range of said receiver in advance of and to correspond to the next signal frequency to be transmitted.

5. The method of measuring field strength at a receiver over a range of frequencies which includes the steps of radiating power which is constant over a desired range of signal frequencies, varying the signal frequency at a constant rate over said desired range, beating the received signal frequency with a locally generated frequency to produce an intermediate frequency, detecting said intermediate frequency and recording same, and automatically retuning said receiver immediately after a measurement is made to change the frequency of said receiver to correspond to the changing signal frequency.

6. A measuring receiving system pre-tuned to a desired signal frequency and suitably calibrated in terms of energy induced in the antenna; a changing signal frequency which when in the response range of the receiver produces a corresponding rectified carrier voltage output; a local oscillator; additional means in the receiver so arranged and constructed that as the changing signal frequency approaches the middle of the receiver response band it is combined with said local oscillator tuned to the middle of said band to produce a beat frequency output, a direct current amplifier having a grid and a condenser connected thereto; an indicating instrument coupled to the output of said direct current amplifier; an electromechanical device for connecting said rectified carrier voltage output to said grid of said amplifier for charging or discharging said condenser to the value of the impressed voltage; an audio amplifier and a rectifier for said beat frequency output; a circuit connection extending between said electromechanical device and said last means for operating said device, whereby when said beat frequency output becomes higher in frequency and passes out of the response band of said audio amplifier said electromechanical device disconnects said grid and condenser from said rectified carrier voltage output; said condenser substantially retaining its charge for a reasonable length of time after the voltage source is disconnected, thereby maintaining the output of said direct current amplifier and the indication of said indicating instrument accordingly.

7. In a high frequency system, the combination with means for transmitting a changing signal frequency having constant power, of a receiver having a frequency response range and tuned to a desired signal frequency, means in said receiver to combine said signal frequency with a locally produced frequency tuned to the middle of the receiver response band for producing a beat frequency output as said changing signal frequency approaches the middle of the receiver response band, a rectifier for said beat frequency output, a direct current amplifier having in circuit with its input electrode a condenser, and a circuit for charging said condenser in accordance with the value of the rectified voltage of said signal, said condenser being under control of said rectifier, and a recorder coupled to the output of said amplifier.

8. In a measuring system, the combination with means for transmitting a changing signal frequency having constant power, of a receiver having a frequency response range and tuned to a desired signal frequency, means in said receiver to combine said signal frequency with a locally produced frequency tuned to the middle of the receiver response band for producing a beat frequency output as said changing signal frequency approaches the middle of the receiver response band, a rectifier for said beat frequency output, a direct current amplifier having in circuit with its input electrode a condenser, and a circuit for charging said condenser in accordance with the value of the rectified voltage of said signal, said condenser being under control of said rectifier, a recorder coupled to the output of said amplifier, and an electromagnetic device under control of said beat frequency output for quickly changing the frequency response of said receiver a desired increment, whereby measurements are made progressively as the signal frequency changes.

9. In a high frequency system, the combination with means for transmitting changing signal frequency having constant power, of a receiver having a frequency response range and tuned to a desired signal frequency, means in said receiver to combine said signal frequency with a locally produced frequency tuned to the middle of the receiver response band for producing a beat frequency output as said changing signal frequency approaches the middle of the receiver response band, a rectifier for said beat frequency output, a direct current amplifier having in circuit with its input electrode a condenser, and a circuit for charging said condenser in accordance with the value of the rectified voltage of said signal, said condenser being under control of said rectifier, a recorder coupled to the output of said amplifier, and a pair of electromagnetic devices under control of said beat frequency output, one of said devices functioning to connect and disconnect said condenser from said rectifier, and the other device responsive immediately after disconnection of said condenser from said rectifier for changing the tuning of said receiver a desired increment.

10. A system in accordance with claim 8, characterized in this that said recorder is an ink recorder in which the paper moves at a constant speed, thereby indicating constant and known signal frequency increments versus incremental distances of paper movement.

11. The method of measuring field strength at a receiver over a range of frequencies which includes the steps of radiating power which is constant over a desired range of frequencies, varying the radiated frequency at a constant rate over said desired range, receiving said continually varying frequency with constant response over the range of frequencies, rectifying the received carrier, and automatically recording said rectified carrier.

12. The method of measuring field strength at a receiver over a range of frequencies which includes the steps of radiating power which is constant over a desired range of signal frequencies, varying the signal frequency at a constant rate over said desired range, receiving said radiated signal frequencies with constant response over said range, automatically changing the response frequency range of the receiver to correspond to the changing signal frequency, combining the received signal frequency at the receiver with a locally generated frequency to produce an intermediate frequency, detecting said intermediate frequency, and automatically recording said detected frequency.

13. In a high frequency system, the combination with a transmitter for radiating power which is constant over a desired range of signal frequencies and which has means for varying the radiated frequency at a constant rate, of a receiver having an energy collecting circuit which will deliver constant voltage for constant field strength at said collecting circuit, said receiver having a frequency response range and being tuned to the transmitted signal frequency, means in said receiver to combine said signal frequency with a locally produced frequency tuned to the middle of the receiver response band for producing a beat frequency output as said changing signal frequency approaches the middle of the receiver response band, a rectifier for said beat frequency output, a direct current amplifier having in circuit with its input electrode a condenser, and a circuit for charging said condenser in accordance with the value of the rectified voltage of said signal, said condenser being under control of said rectifier, and a recorder coupled to the output of said amplifier.

RALPH W. GEORGE.